US005619001A

United States Patent [19]

Pasin et al.

[11] Patent Number: 5,619,001

[45] Date of Patent: Apr. 8, 1997

[54] HARP HOLDER

[75] Inventors: Mark Pasin, Oak Park; Fred Michelau, Des Plaines, both of Ill.

[73] Assignee: Blues Tools, Inc., Oak Park, Ill.

[21] Appl. No.: 557,492

[22] Filed: Nov. 14, 1995

[51] Int. Cl.[6] .............................. G01D 7/12; E05D 11/10

[52] U.S. Cl. .................................. 84/379; 16/329; 16/330

[58] Field of Search ...................... 84/379, 377; 224/185, 224/197, 201, 265, 910; 16/112, 329, 330, 331, 338, 341

[56] References Cited

U.S. PATENT DOCUMENTS

| | | | |
|---|---|---|---|
| 769,509 | 9/1904 | Sutter | 84/379 |
| 1,954,169 | 4/1934 | Tuter | 84/379 |
| 4,196,821 | 4/1980 | Teti, Jr. et al. | 220/94 R |
| 5,168,601 | 12/1992 | Liu | 16/126 |
| 5,377,368 | 1/1995 | Cheng | 5/991 |

*Primary Examiner*—Michael L. Gellner
*Assistant Examiner*—Shihyung Hsieh
*Attorney, Agent, or Firm*—Rudnick & Wolfe

[57] ABSTRACT

A holder adapted to be worn by a musician and adapted for supporting a harp to permit hands-free playing of the harp. The holder includes a supporting section comprising a pair of arms adapted for positioning in front of and at opposite sides of the musician's face. A harp supporting member extends between the outer ends of the arms and is adapted to support the harp adjacent the musician's mouth. A shoulder-engaging section is pivotally attached at the opposite ends of these arms and a first adjusting means enables adjustment of the relative positions of the outer end and the opposite end of each arm. A second adjusting means enables adjustment of the position of the shoulder-engaging section relative to the position of the opposite ends of the supporting section.

11 Claims, 4 Drawing Sheets

HARP HOLDER

BACKGROUND OF THE INVENTION

This invention relates to a holder for use by musicians. In particular, the apparatus is designed for supporting a harp of the type also commonly known as a harmonica. The holder includes a shoulder support so that a musician can position the harp adjacent his or her mouth which permits playing of the harp while the hands are free to play another instrument such as a guitar.

Harp holders of the general type described have been available to musicians. It has been found, however, that such prior art holders are deficient from the standpoint that they are not particularly easy to use and are not readily adaptable to the differences in habits and physical characteristics of musicians.

SUMMARY OF THE INVENTION

The harp holder of this invention consists of two basic parts: a section which includes a support for the harp and a shoulder-engaging section. These parts are adjustable with respect to each other, and the particular means for achieving the adjustment provide a most efficient and useful combination.

The section which supports the harp includes a pair of arms which, in use, extend upwardly in front of the users face and on opposite sides thereof. The outer ends of these arms are connected to a crosswise extending support for the harp whereby the harp is positioned adjacent the user's mouth.

In a preferred form of the invention, the opposite ends of the arms are pivotably and adjustably connected to the shoulder engaging section of the holder. In addition, a separate adjustment is achievable by providing these arms with an extension piece. The extension piece for each arm may assume one of several positions relative to the ends of the arms, and fasteners are employed to hold these pieces in the desired position.

The adjustment of the relative position of the respective holder sections is preferably achieved by supporting a first engaging element at each opposite end of the arms used for the harp support. Second engaging elements are, in turn, attached at the forward ends of the shoulder-engaging section.

The surfaces of these engaging elements preferably define serrations which mate when the surfaces are in contact whereby relative movement between the surfaces is prevented. When the surfaces are held apart, pivotal connections between the sections permit the user to select from numerous relative positions of the respective sections.

The particular means for achieving this adjusting capability comprises the utilization of a shoulder-engaging section having an arcuate shape. This shape is formed by means of arms adapted to extend forwardly along each side of the musician's neck, and a transverse portion extending between these arms behind the user's neck.

One serrated engaging surface is fixed at the end of one arm. An internally mounted spring serves to normally hold this surface away from the opposed serrated mating surface. A threaded knob or the like is operable to press the surfaces together or to release the engagement when adjustment is desired.

The described combination enables the musician to make two independent adjustments to permit maximum effectiveness when the device is in use. The first adjusting means enables the user to select from a variety of possible orientations of the harp supporting means which include the vertically extending arms of the device. The second adjusting means allows fine adjustments of these arms relative to the shoulder engaging section of the device. This constitutes a most convenient feature since this adjustment preferably takes place with the device already in place around the user's neck.

When not in use, the device is conveniently collapsed into a compact form. This simplifies shipping, handling and storage, and once initial adjustments are made, the device can be readily restored from the compact form to the musician's preferred position of use.

DETAILED DESCRIPTION OF THE DRAWINGS

Figure 1:
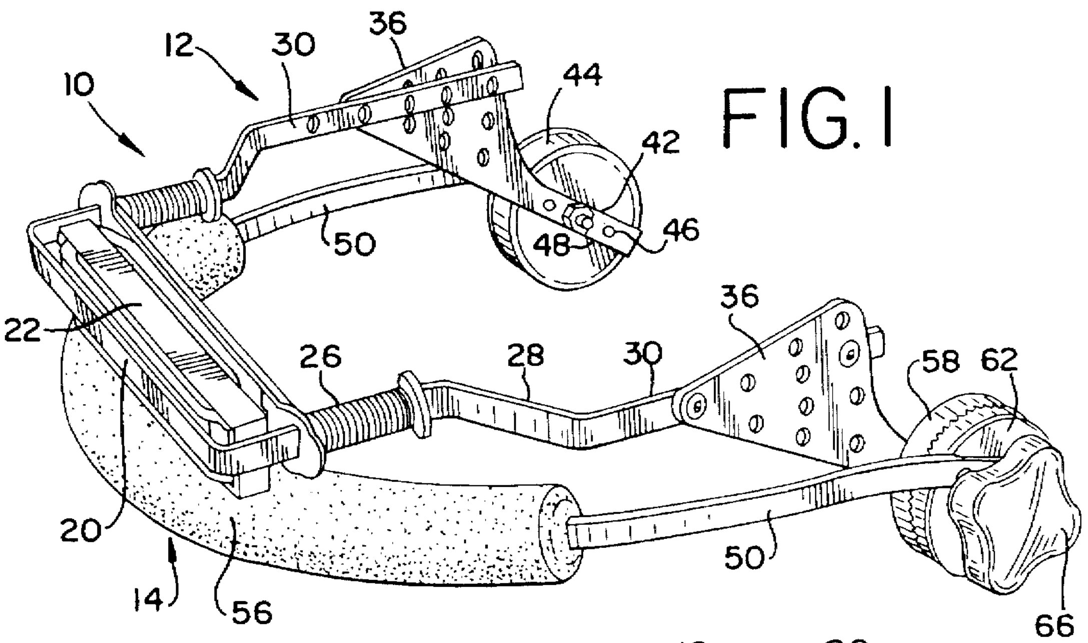
FIG. 1 is a perspective view of a harp holder characterized by the preferred features of this invention shown in a collapsed form.
Figure 2:
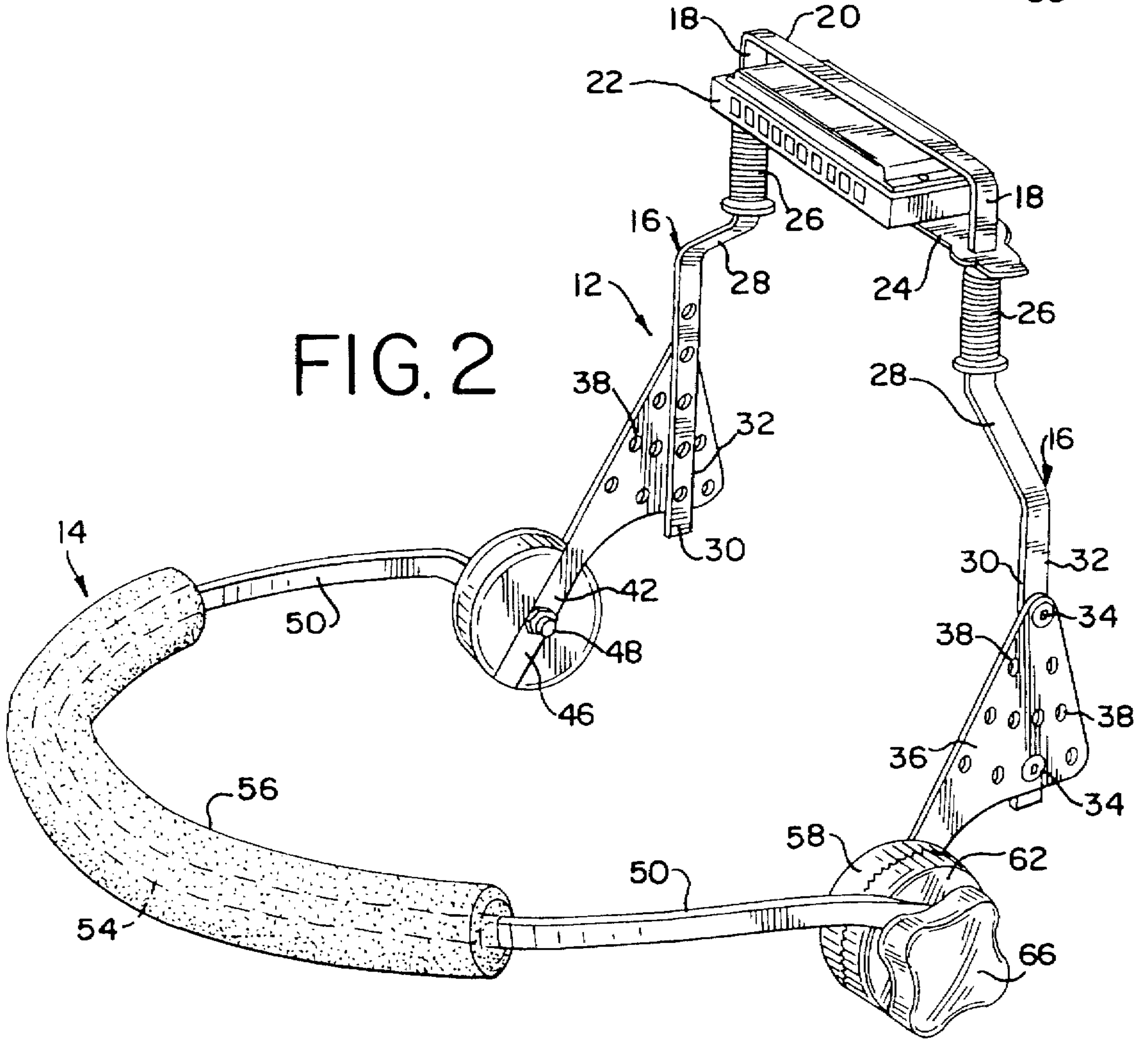
FIG. 2 is a perspective view of the device as it appears when set for use.
Figure 3:
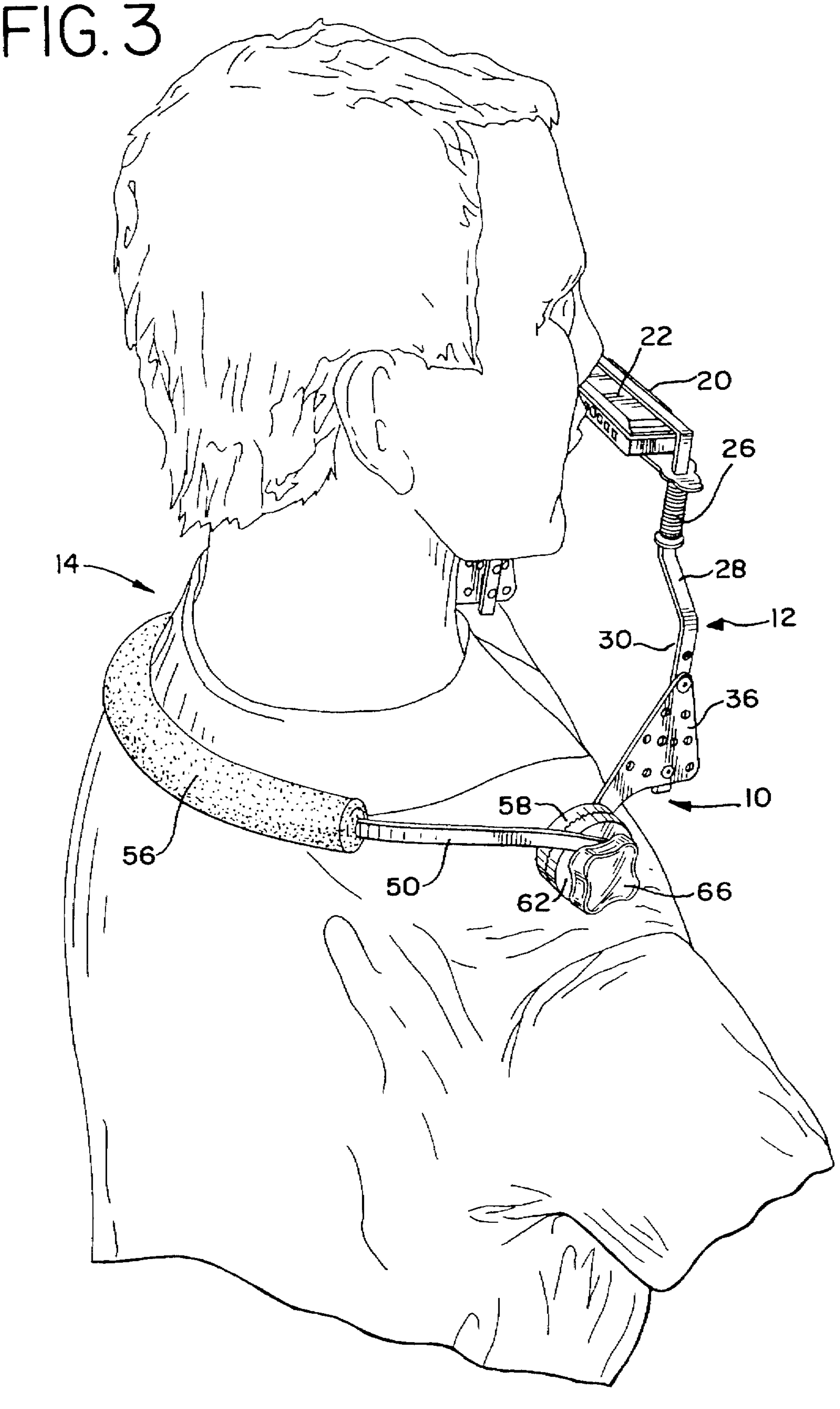
FIG. 3 is a perspective view of the device positioned around the neck of a musician.

FIGS. 1–3 illustrate a harp holder 10 consisting of a harp supporting section 12 and a shoulder-engaging section 14. In FIGS. 2 and 3, the device is illustrated with the sections in their approximate relative positions for use. In FIG. 1, the device is shown with the sections collapsed which facilitates shipping, handling and storage of the device.

The section 12 of the device includes a pair of arms 16. These arms extend to spaced-apart upper ends 18 which are connected by means of an integrally formed transverse member 20. A harp or harmonica 22 is positioned between this transverse member and a plate 24. The plate defines openings which receive arms 16, and springs 26 serve to press the plate against the harp and thereby hold the harp in position.

The arms 16 are formed with outwardly bent portions 28 so that the opposed lower ends 30 of the arms are spaced apart sufficiently to comfortably fit in front of and at the sides of the musician's face. These lower ends each define a plurality of threaded openings 32 adapted to receive fasteners 34. Extension plates 36 are attached to each of these lower ends by means of the fasteners.

The plates 36 also define a plurality of openings 38. Accordingly, the musician has several options with respect to selecting alignment of openings 32 and 38 with the particular selection affecting the orientation of the harp relative to the user 's mouth. For a particular musician, the selection may require some experimentation with the device in place around the neck, but once the best orientation is determined, the user would insert fasteners 34 and would not ordinarily make any further change. In the embodiment shown, the fasteners 34 are threaded with a hex recess in the head for receiving a mating tool. The openings 32 in arm ends 30 are internally threaded to receive the fasteners.

Figure 6:
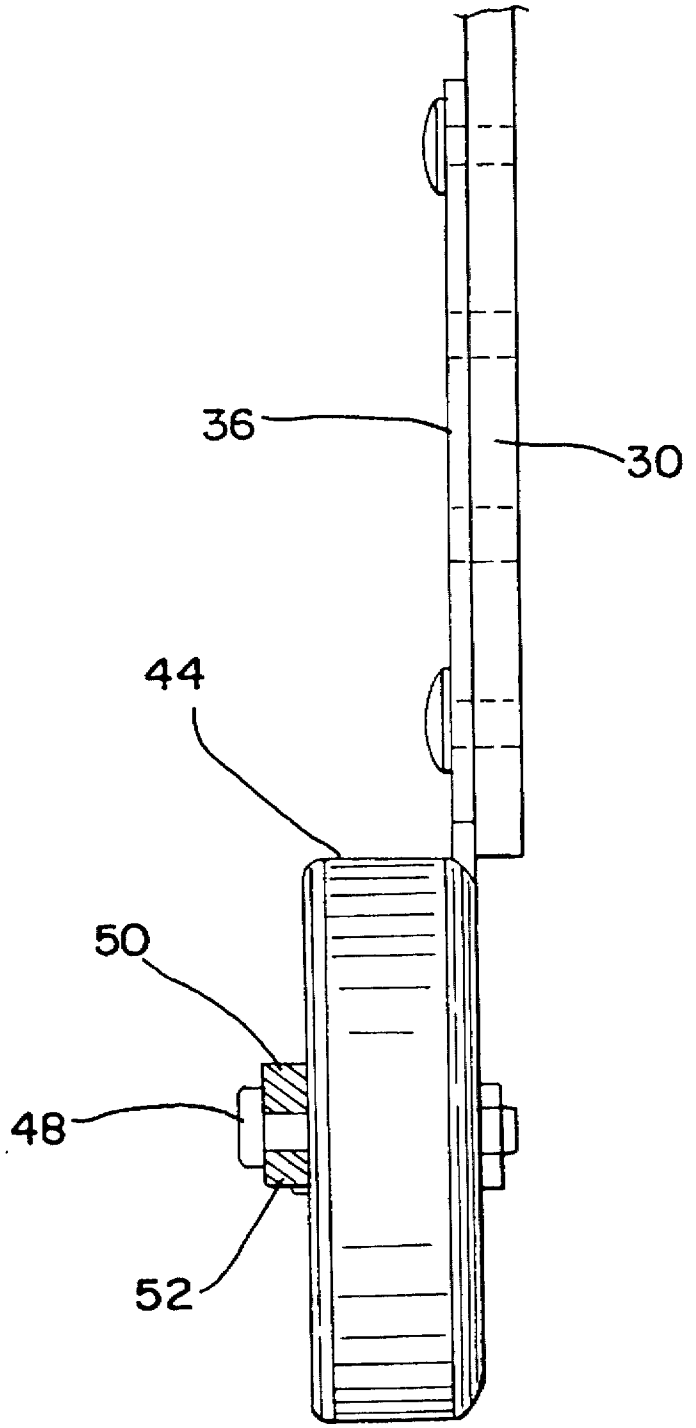

The extension plate 36 on one side includes arm 42 which fits against cylindrical block 44 and is held in a fixed position on the block by means of rivets or other fasteners 46. A pin 48 is supported by the block for pivotally connecting shoulder-engaging section 14 as shown in FIG. 6.

Specifically, the section 14 includes side arms 50 with the end 52 of one arm freely pivotable about the pin 48. An integral transverse portion 54 interconnects the side arms, and a foam pad 56 or the like is located on this transverse portion for engagement behind the user's neck as shown in FIG. 3.

The other extension plate 36 includes arm 42 which fits in a channel defined by cylindrical block 58 and is held in a fixed position on the block by means of threaded fasteners 60. The other arm 50 of the section 14 is received in a channel defined by an additional cylindrical block 62. An opening 63 in this arm and a central bore 61 in the block 62 permit fitting of the block around threaded pin 64. The pin 64 is supported in a fixed position on block 58.

Figure 5:
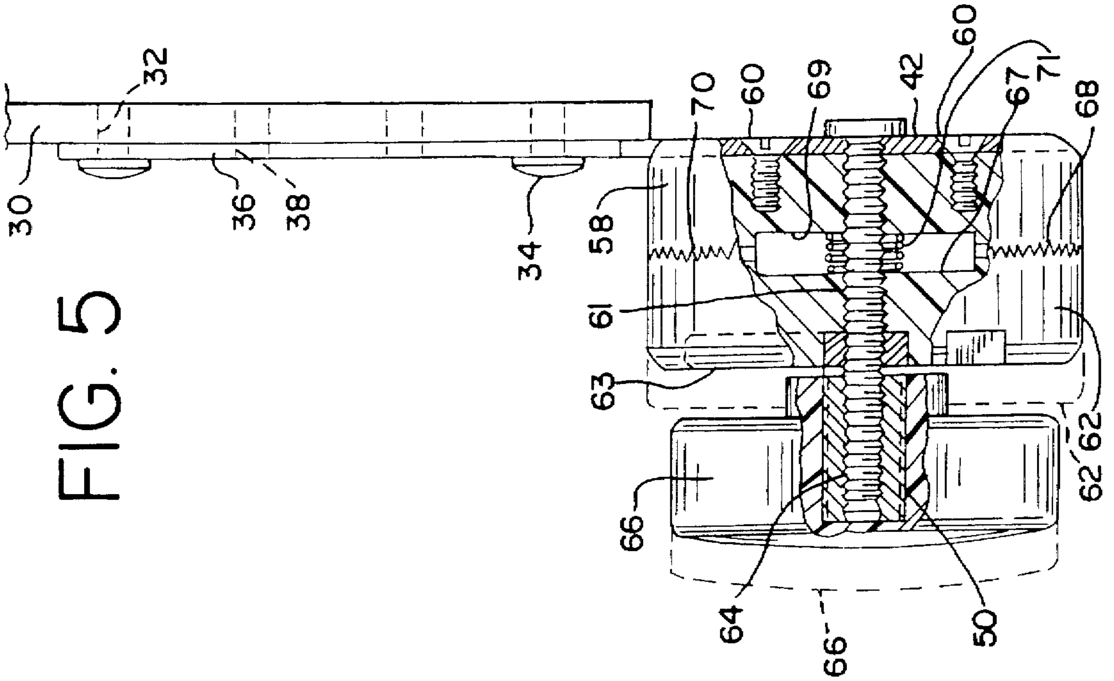
FIG. 5 is an enlarged fragmentary front elevational view of the adjustment means, partly cut away; and, FIG. 6 is an enlarged fragmentary rear elevational view of the pivotal connection on the opposite side of the device.
Figure 4:
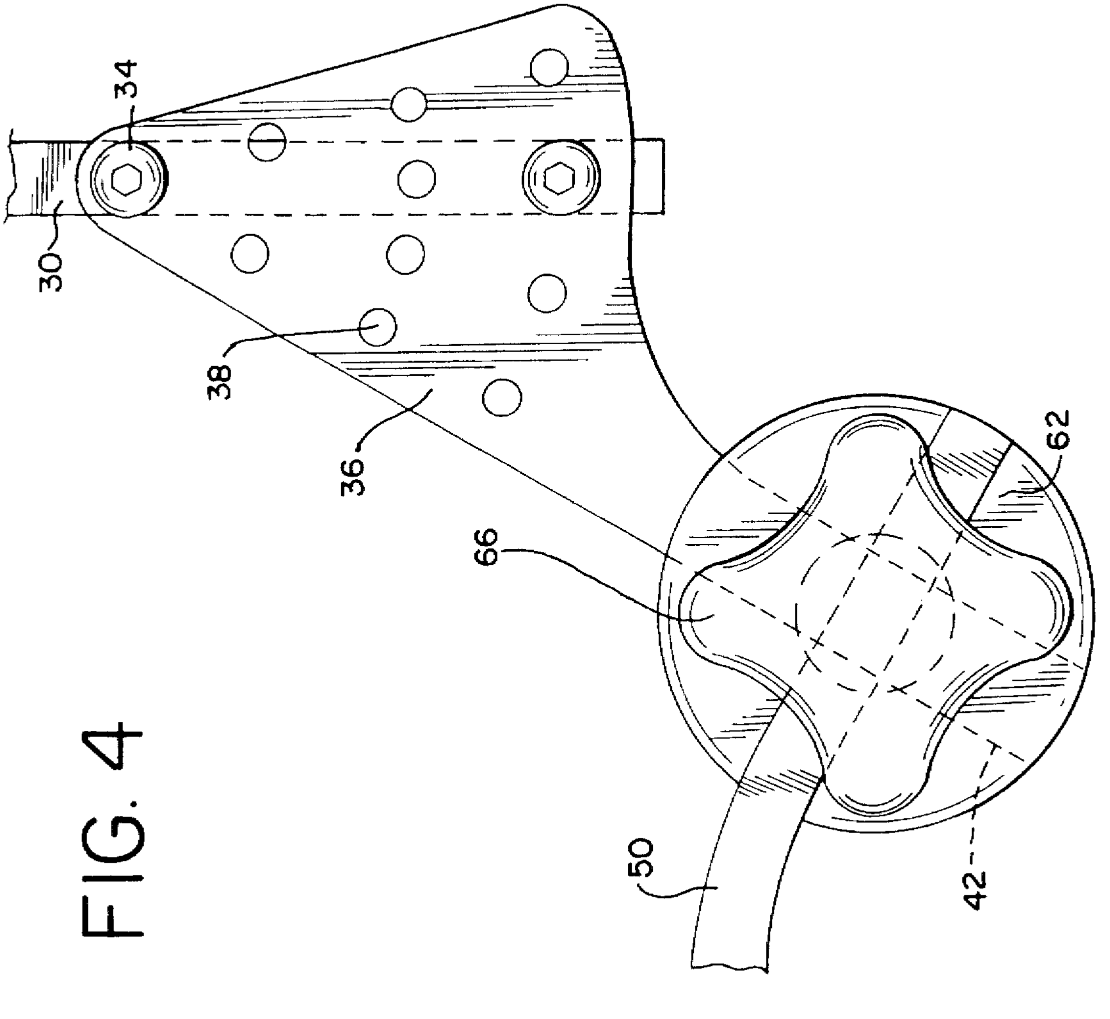
FIG. 4 is an enlarged fragmentary side view of the adjustment means used for the adjustment device.

Internally threaded knob 66 rotates relative to pin 64 and can thereby be moved to the dotted line position shown in FIG. 5. Spring 67 is located within respective recesses 69 and 71 of blocks 58 and 62 whereby backing off of the knob moves the block 62 to the dotted line position.

Preferably, the respective internal faces 68 and 70 of the blocks 62 and 58 define serrations. Accordingly, when the knob is rotated to bring the faces into engagement, the arm 50 will be locked in position, and the section 14 will be fixed against rotation relative to the section 12. This permits the user to select from among a great number of relative positions of these sections.

In use, the harp holder 10 may be packaged, shipped and stored in the compact form shown in FIG. 1. Particularly when being adjusted by a musician for the first time, the holder can be placed around the neck with the sections 12 and 14 at an approximately 90° angle. The user can then determine whether the attachment of the arms 16 to plates 36 requires adjustment.

Once a comfortable relationship of the arms 16 and plates 36 is determined, this adjustment would normally remain fixed unless the holder is to be used by more than one person. The adjustment achievable with the knob 66, on the other hand, will normally take place on a regular basis since the user will find it convenient to return the holder to the compact form for storage and for transportation from one location to the other. This adjustment operation is, however, very easy to perform since the user will have both hands free when the holder is placed around the neck.

In particular, the user can hold and pivot the section 12 until the precise desired relationship of the mouth and harp 22 is achieved. The other hand of the user is then used to rotate knob 66 whereby this relationship is fixed.

It will be understood that various changes and additions to the harp holder described can be made without departing from the spirit of the invention particularly as described in the following claims.

That which is claimed is:

1. A holder adapted to be worn by a musician having a face and a mouth, the holder being adapted for supporting a harp adjacent the musician's face to permit hands-free playing of the harp, said holder including a harp-supporting section comprising a pair of arms adapted for positioning in front of and at opposite sides of the musician's face, said arms each defining an outer end and an opposite end, a harp supporting member extending between the outer ends of the arms and adapted to support the harp adjacent the musician's mouth, and a shoulder-engaging section pivotally attached at the opposite ends of said arms, each of said outer ends and said opposite ends defining a position, first adjusting means enabling adjustment of the position of the outer end of each arm relative to the position of the opposite end of each arm for thereby adjusting the distance between the outer end and the opposite end of each arm and also adjusting the angular relationship of the outer end and the opposite end of each arm, said shoulder engaging section defining a position, and second adjusting means enabling adjustment of the position of said shoulder-engaging section relative to the position of said opposite ends of said arms.

2. A holder according to claim 1 including an extension piece forming part of each arm, said opposite end of an arm being defined by the extension piece, and fasteners for securing the respective extension pieces in preferred positions relative to the balance of an arm to thereby provide said first adjusting means.

3. A holder according to claim 2 wherein at least one of said balance of said arm and the extension piece attached thereto define a plurality of openings to provide alternative positions for location of said fasteners.

4. A holder according to claim 3 wherein each extension piece comprises a plate member, a plurality of openings defined by the plate member, and a plurality of openings defined by the balance of said arms attached thereto, said fasteners being inserted in aligned openings in a respective plate member and balance of said arm to achieve the preferred relative position.

5. A holder according to claim 1 wherein the musician has a neck defining a back and sides, said shoulder-engaging section including side arms adapted to extend from the back of the musician's neck forwardly along the sides of the neck, and a transverse portion adapted to extend between said side arms across the back of the neck, said side arms each defining a forward end portion, junctures defined by the forward end portions and opposite ends, said second adjusting means being located at the junctures of said forward end portions and said opposite ends of the pair of arms connected to said harp-supporting member.

6. A holder according to claim 5 wherein said second adjusting means comprises a first engaging element attached to one of said opposite ends, a second engaging element attached to the forward end portion which is connected to said one of said opposite ends, means for positioning the respective engaging elements apart, pivotal connections between the respective forward ends and opposite ends whereby said ends are relatively movable when the engaging elements are positioned apart, and means for bringing the engaging elements into engagement for holding the respective ends in desired relative positions.

7. A holder according to claim 6 wherein the engaging elements define mating serrated surfaces, said means for bringing the engaging elements into engagement operating to press the serrated surfaces together to prevent relative movement therebetween.

8. A holder according to claim 1 wherein said harp-supporting section is adapted to be pivoted into a collapsed position relative to said shoulder-engaging section to provide a compact unit for shipping, handling and storage.

9. A holder adapted to be worn by a musician having a face and a mouth, and adapted for supporting a harp adjacent the musician's face to permit hands-free playing of the harp, said holder including a harp-supporting section comprising a pair of arms adapted for positioning in front of and at opposite sides of the musician's face, said arms each defining an outer end and an opposite end, a harp supporting member extending between the outer ends of the arms and adapted to support the harp adjacent the musician's mouth, and a shoulder-engaging section pivotally attached at the opposite ends of said arms, each of said outer ends and said opposite ends defining a position, first adjusting means enabling adjustment of the position of the outer end of each arm relative to the position of the opposite end of each arm for thereby adjusting the distance between the outer end and the opposite end of each arm and also adjusting the angular relationship of the outer end and the opposite end of each arm, said shoulder engaging section defining a position, and second adjusting means enabling adjustment of the position of said shoulder-engaging section relative to the position of said opposite ends of said arms, the musician also having a neck defining a back and sides, said shoulder-engaging section including side arms adapted to extend from the back of the musician's neck forwardly along the sides of the neck, and a transverse portion adapted to extend between said side arms across the back of the neck, said side arms each defining a forward end portion, junctures defined by the forward end portions and opposite ends, said second adjusting means being located at the junctures of said forward end portions and said opposite ends of the pair of arms connected to said harp-supporting member, said second adjusting means comprising a first engaging element attached to one of said opposite ends, a second engaging element attached to the forward end portion which is connected to said one of said opposite ends, means for positioning the respective engaging elements apart, pivotal connections between the respective forward ends and opposite ends whereby said ends are relatively movable when the engaging elements are positioned apart, and means for bringing the engaging elements into engagement for holding the respective ends in desired relative positions, the engaging elements defining mating serrated surfaces, said means for bringing the engaging elements into engagement operating to press the serrated surfaces together to prevent relative movement therebetween, and including resilient means normally holding said engaging surfaces apart.

10. A holder according to claim 9 wherein a threaded member extends outwardly from one serrated surface, an opening for receiving said threaded member defined by the end defining the other serrated surface, and an internally threaded knob adapted to receive said threaded member whereby rotation of the knob operates to bring said serrated surfaces into and out of engagement.

11. A holder adapted to be worn by a musician having a face, a mouth, and a neck having a back and sides, said holder being adapted for supporting a harp adjacent the musician's face to permit hands-free playing of the harp, said holder including a harp-supporting section comprising a pair of arms adapted for positioning in front of and at opposite sides of the musician's face, said arms each defining an outer end and an opposite end, a harp-supporting member extending between the outer ends of the arms and adapted to support the harp adjacent the musician's mouth, and a shoulder-engaging section pivotally attached at the opposite ends of said arms, said shoulder-engaging section including side arms adapted to extend from the back of the musician's neck forwardly along the sides of the neck, and a transverse portion adapted to extend between said side arms across the back of the neck, said side arms each defining a forward end portion, said forward end portions and said opposite ends being joined together to thereby form respective junctures, adjusting means enabling adjustment of the position of said shoulder-engaging section relative to the position of said opposite ends of said supporting section, said adjusting means being located at each of said junctures of said forward end portions and said opposite ends, said adjusting means each comprising a first engaging element attached to one of said opposite ends, a second engaging element attached to the forward end which is joined together with said one opposite end, means for positioning the respective engaging elements apart, pivotal connections between the respective forward ends and opposite ends whereby said ends are relatively movable when the engaging elements are positioned apart, and means for bringing the engaging elements into engagement for holding the respective ends in desired relative positions, the engaging elements defining mating serrated surfaces, said means for bringing the elements into engagement comprising a threaded member extending outwardly from one serrated surface, an opening for receiving said threaded member defined by the engaging element defining the other serrated surface, and an internally threaded knob adapted to receive said threaded member whereby rotation of the knob operates to bring said serrated surfaces into and out of engagement, said means for bringing the elements into engagement operating to press the serrated surfaces together to prevent relative movement therebetween, and including resilient means normally holding said serrated surfaces apart.

* * * * *